(12) United States Patent
Schneider et al.

(10) Patent No.: US 7,962,270 B2
(45) Date of Patent: Jun. 14, 2011

(54) METHOD FOR CONTROLLING AN AUTOMOTIVE HYDRAULIC PUMP

(75) Inventors: Florian Schneider, Lindenberg (DE); Thomas Jäger, Meckenbeuren (DE); Marcus Gansohr, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 831 days.

(21) Appl. No.: 11/578,839

(22) PCT Filed: Apr. 9, 2005

(86) PCT No.: PCT/EP2005/003748
§ 371 (c)(1),
(2), (4) Date: Nov. 29, 2007

(87) PCT Pub. No.: WO2005/103502
PCT Pub. Date: Nov. 3, 2005

(65) Prior Publication Data
US 2008/0133097 A1    Jun. 5, 2008

(30) Foreign Application Priority Data
Apr. 22, 2004   (DE) .......................... 10 2004 019 511

(51) Int. Cl.
*G06F 7/00* (2006.01)
(52) U.S. Cl. .............................. 701/78; 701/83; 303/167
(58) Field of Classification Search .................... 701/48, 701/70, 71, 78, 83; 303/167, 115.5, 116.1
See application file for complete search history.

(56) References Cited

U.S. PATENT DOCUMENTS

| | | | |
|---|---|---|---|
| 4,402,554 A * | 9/1983 | Belart | 303/10 |
| 4,880,282 A * | 11/1989 | Makino et al. | 303/116.2 |
| 5,197,787 A * | 3/1993 | Matsuda et al. | 303/10 |
| 5,794,734 A | 8/1998 | Fahl et al. | |
| 5,971,500 A * | 10/1999 | Voges et al. | 303/113.4 |
| 6,142,581 A * | 11/2000 | Yamaguchi et al. | 303/113.2 |
| 6,533,365 B1 * | 3/2003 | Hachtel | 303/11 |
| 6,595,598 B2 * | 7/2003 | Harris et al. | 303/11 |
| 7,091,626 B2 | 8/2006 | Bluemel et al. | |
| 7,413,263 B2 * | 8/2008 | O'Dea et al. | 303/11 |
| 7,621,602 B2 * | 11/2009 | Sato et al. | 303/11 |
| 2011/0071001 A1 * | 3/2011 | Yu et al. | 477/203 |

FOREIGN PATENT DOCUMENTS

| | | |
|---|---|---|
| DE | 197 14 513 A1 | 10/1998 |
| DE | 198 30 089 A1 | 1/2000 |
| DE | 100 46 631 A1 | 3/2002 |
| EP | 0 305 950 A1 | 3/1989 |
| EP | 0 469 615 A1 | 5/1992 |
| EP | 1 072 491 A2 | 1/2001 |
| JP | 09-002096 | 1/1997 |
| WO | WO-95/09740 | 4/1995 |
| WO | WO-03/031244 A1 | 4/2003 |

* cited by examiner

*Primary Examiner* — Mark Hellner
*Assistant Examiner* — Helal A Algahaim
(74) *Attorney, Agent, or Firm* — Davis & Bujold, P.L.L.C.

(57) ABSTRACT

A method for controlling an automotive hydraulic pump, wherein the hydraulic pump is activated to increase the pressure in a hydraulic accumulator associated therewith once the pressure falls below a predetermined lower pressure threshold, and the hydraulic pump is switched off once the pressure exceeds a predetermined upper pressure threshold value (P_O). The solution is to reduce fuel consumption of the vehicle, wherein the hydraulic pump is activated during different operating phases of the vehicle at different lower pressure values (P_U1, P_U2) in the event of a hydraulic pressure drop in the hydraulic accumulator of the hydraulic pump.

11 Claims, 1 Drawing Sheet

A

B

METHOD FOR CONTROLLING AN AUTOMOTIVE HYDRAULIC PUMP

FIELD OF THE INVENTION

The invention relates to a method for controlling a hydraulic pump in a motor vehicle.

BACKGROUND OF THE INVENTION

Actuators actuated with pressurized media are increasingly used in motor vehicles and make the operation of such vehicles safer and easier. Such vehicle systems supported by auxiliary power are, for example, steering boosters, power assist brake units, and clutch actuation devices. Pressurized media is required for operating these actuators, which may be configured, for example, as piston-cylinder arrangements, where the media can be gas or hydraulic fluids. A mechanically or electrically driven hydraulic pump supplies, during operation, such media at an operating-pressure level which suffices for producing the required actuator forces.

A known method of minimizing the negative influence on fuel consumption of vehicles equipped this way is supplying the media to an accumulator, at a sufficiently high actuating-pressure, by means of the hydraulic pump. Since the use of the media pressure in the affected actuators typically occurs discontinuously, the hydraulic pump is only activated by means of the known control devices and/or control methods when the pressure in the accumulator has dropped below a predefined lower-pressure threshold. This lower-pressure threshold is still above the required actuating-pressure for the aforementioned actuators, so that their operation is guaranteed even during such a pressure-charging phase. The hydraulic pump is turned off when a predefined upper-pressure threshold has been reached. A hydraulic pressure system configured in this way is known, for example, from DE 198 30 089 A1.

SUMMARY OF THE INVENTION

In the ongoing endeavor to improve motor vehicles, it is the object of the invention to propose a method for controlling the operation of a hydraulic pump in a pressure system of this kind, this method allowing the fuel consumption of a vehicle, equipped with actuators actuated by auxiliary power, to be reduced further.

The invention is based on the realization that the energy expenditure for operating the hydraulic pump can be provided in a fuel-saving manner when the vehicle is in a trailing throttle operation or a braking operation. During these operating phases, the kinetic energy of the vehicle is reduced, this being achieved primarily through frictional losses in the drive train and/or on the vehicle service brakes. When the hydraulic pump is activated during these operating phases, the pump advantageously converts this fuel-saving kinetic energy into a pressure-increase of the media.

The invention therefore relates to a method for controlling a hydraulic pump in a motor vehicle wherein the hydraulic pump is activated in order to increase the pressure in an associated accumulator when a predefined lower-pressure threshold is no longer present, and wherein the same is turned off when a predefined upper pressure threshold is exceeded. In order to achieve the object at hand, there is also provision for the hydraulic pump to be activated during different operating phases of the vehicle at varying lower-pressure threshold values when there is a drop in the media pressure in the accumulator.

With this method, it is possible to activate the hydraulic pump, in a fuel-saving manner, comparatively more frequently in the braking and/or trailing throttle operation of the vehicle than in the traction mode. While these braking and trailing throttle operation phases are typically short in duration, they occur relatively often, for example in city traffic or when operating the vehicle on rural roads. Overall, this results in relatively long periods during which the hydraulic pump is active and thus maintains the media pressure at a comparatively high level. It is particularly advantageous that these pressure-charging processes occur during operating phases when no driving energy that would be useful for propelling the vehicle has to be used, this energy being used instead to reduce vehicle speed.

Provided that the vehicle, for example during extended highway trips, is operating only in the traction mode, the hydraulic pump is turned on when a different predefined lower-pressure threshold is no longer present, wherein this lower pressure threshold value is smaller than the lower-pressure threshold for the trailing throttle and/or the braking operation.

In order to ensure that following an extended deactivation phase, the pressure media in the accumulator, after start-up of the vehicle, has a sufficiently high pressure for actuation of the actuators, one embodiment of the method according to the invention provides for the hydraulic pump to be activated during the first operating phase immediately after starting the vehicle and until the predefined upper pressure threshold has been reached.

Provided that the necessary media pressure is available in the accumulator, immediate activation of the hydraulic pump occurs only in operating phases when the driving motor of the vehicle generates no energy for propulsion of the vehicle. This has the advantage of making the operation of the hydraulic pump dependent on the pressure in the accumulator as well as the accelerator pedal position.

Finally, it can be provided that, in the idle state of the driving motor with a disengaged clutch between the driving motor and the transmission, the hydraulic pump is activated when the smaller of the two lower-pressure thresholds is no longer present. Within the framework of the invention, it may also be provided that for the aforementioned idle operation, a third lower-pressure threshold is used which may, for example, be below the pressure threshold of the traction mode.

In this way, it is ensured that sufficiently high pressure is always available in the accumulator even when the vehicle is standing still, with the driving motor running, as this pressure does not have to be maintained at the relatively high pressure level, as during the trailing throttle and/or the braking phases. Compared to known control methods, this pressure-charging operation during the engine's idle state results in only small fuel savings, however, so far it has not been known to turn on the hydraulic pump in the idle state of the motor when the smaller one of several lower pressure threshold is no longer present.

BRIEF DESCRIPTION OF THE DRAWING

Based on the attached drawing, the invention will be explained in more detail.

DETAILED DESCRIPTION OF THE INVENTION

Figure 1:
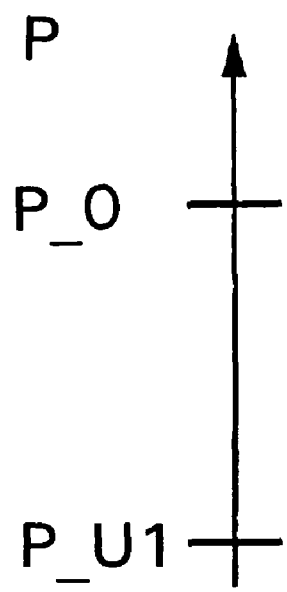
Figure 1:
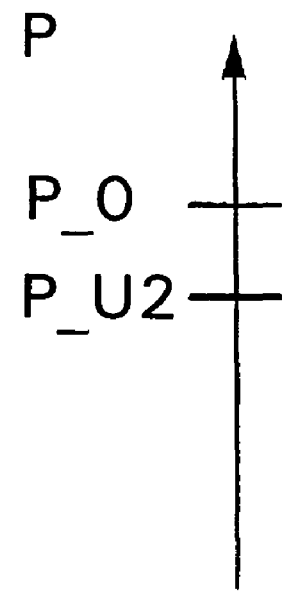

On the left side of the drawing, the pressure of the pressurized media in the accumulator, on scale A, is shown for the traction mode and the idle phases. The pressure of the media during such phases is raised to an upper-pressure threshold value P_O by activating the hydraulic pump, which is then turned off.

By operating the actuators, which are connected to the accumulator via controlled valves, the pressure in the accumulator decreases. As soon as the pressure has dropped below a predefined lower-pressure threshold P_U1, in the traction mode of the vehicle, the hydraulic pump is activated again, thus raising the pressure again to the value P_O.

This method of operation, as mentioned above, also applies during phases when the vehicle is stationary, with the driving motor idling and the clutch between the driving motor and transmission disengaged. This way, even during an initial start-up of the vehicle following an extended stationary period, it is guaranteed that the pressure in the accumulator is raised to the value P_O immediately after starting the driving motor and that it does permanently not drop below the lower pressure threshold P_U1.

As the right side of the drawing shows, on the basis of Scale B for the pressure of the media in the accumulator, the upper-pressure threshold value P_O also represents the maximum value of the pressure in the accumulator that is reached during the braking and/or the trailing throttle operation phases. Deviating from Scale A, however, it is apparent that the lower-pressure threshold P_U2 is much closer to this upper-pressure threshold P_O. This means that during the vehicle's braking and/or trailing throttle phases, the hydraulic pump is turned on much earlier than it is during a traction phase.

As a result, the lower pressure threshold switches from the value P_U1 to the value P_U2 whenever a controller detects the braking and/or trailing throttle operation for the hydraulic pump. Consequently, the hydraulic pump is activated with a relatively small drop in media pressure, thus maintaining the pressure in the accumulator at a relatively high level.

The advantage of this kind of control of the hydraulic pump is that even very short braking and/or trailing throttle operation phases are utilized to increase the pressure in the accumulator. These pressure-increasing processes also occur in a fuel-saving manner during operating phases in which no driving energy of the driving motor is required for vehicle propulsion. The driving energy for the pressure-charging process is obtained instead from the kinetic energy of the vehicle that would otherwise be converted into heat due to the action of frictional forces on the vehicle brakes and/or in the drive train.

REFERENCE LETTERS

A pressure scale for the pressure in the accumulator for the traction operation
B pressure scale for the pressure in the accumulator for the trailing throttle operation
P_0 upper-pressure threshold
P_U1 lower-pressure threshold for traction operation and idle mode
P_U2 lower-pressure threshold for trailing throttle operation and braking operation

The invention claimed is:

1. A method of controlling a pressure-medium pump in a motor vehicle, the method comprising the steps of:
    activating the pressure-medium pump in order to increase a pressure in an associated pressure accumulator when the pressure in the associated pressure accumulator falls below a lower pressure threshold value,
    switching off the pressure-medium pump when the pressure in the associated pressure accumulator is greater than an upper pressure threshold value (P_O),
    in an event of a drop of the pressure in the associated pressure accumulator, activating the pressure-medium pump when the pressure in the associated pressure accumulator falls below a first lower pressure limit value (P_U1), during a first operating phase of the vehicle, and activating the pressure-medium pump when the pressure in the associated pressure accumulator falls below a different second lower pressure limit value (P_U2), during a second operating phase of the vehicle
    operating the pressure-medium pump, after starting the vehicle, until the upper pressure threshold value (P_O) is reached in the associated pressure accumulator;
    defining the second lower pressure limit value (P_U2) as being higher than the first lower pressure limit value (P_U1); and
    utilizing the second lower pressure limit value (P_U2), during one of a braking phase and a trailing throttle phase, for increasing the pressure in the associated accumulator while utilizing the first lower pressure limit value (P_U1), during a traction operating phase, for increasing the pressure in the associated accumulator.

2. The method according to claim 1, further comprising the step of activating the pressure-medium pump during an operating phase in which a motor of the vehicle is not providing any propulsion force for the vehicle.

3. The method according to claim 1, further comprising the steps of activating the pressure-medium pump during an operating phase in which a motor of the vehicle is not providing any propulsion force for the vehicle, and
    disengaging a clutch located between the motor and a transmission.

4. The method according to claim 3, wherein when the clutch is disengaged and the motor is idling, only operating the pressure-medium pump when a smaller of the first and the second lower pressure limit values (P_U1, P_U2) occurs.

5. A method of controlling a hydraulic pump in a motor vehicle, the method comprising the steps of:
    defining an accumulator upper-pressure threshold (P_O);
    defining at least a first accumulator lower pressure threshold value (P_1) and a second accumulator lower pressure threshold value (P_2) with the second accumulator lower pressure threshold value (P2) being higher than the first accumulator lower pressure threshold value (P_1);
    defining a traction operating phase as a first driving situation;
    defining at least one of a braking phase and a trailing throttle phase as a second driving situation;
    activating the hydraulic pump, immediately after starting of the vehicle, to increase the pressure in an associated accumulator if the pressure in the associated accumulator is less than the first lower-pressure threshold (P_1);
    activating the hydraulic pump, during the second driving situation, to increase the pressure in the associated accumulator if the pressure in the associated accumulator is less than the second lower-pressure threshold (P_2);
    activating the hydraulic pump, during the first driving situation, to increase the pressure in the associated accumulator if the pressure in the associated accumulator is less than the first lower-pressure threshold (P_1); and
    deactivating the hydraulic pump once the upper-pressure threshold (P_O) is exceeded.

6. The method according to claim 5, further comprising the step of activating the hydraulic pump, when a motor of the vehicle is not generating any propulsion force for the vehicle, to increase the pressure in the associated accumulator if the pressure in the accumulator is less than the upper-pressure threshold (P_O).

7. The method according to claim 6, further comprising the step of, when a motor of the vehicle is not generating any propulsion force for the vehicle, disengaging a clutch located between the motor and a transmission.

8. The method according to claim 5, further comprising the steps of, when a clutch located between a motor and a transmission is disengaged and the motor is idling, activating the hydraulic pump to increase the pressure in the associated accumulator if the pressure in the associated accumulator is less than the second lower-pressure threshold (P_2).

9. The method according to claim 6, further comprising the step of when a clutch, located between the motor and a transmission, is disengaged and the motor is idling, activating the hydraulic pump to increase the pressure in the associated accumulator if the pressure in the associated accumulator is less than the second predefined lower-pressure threshold (P_2).

10. The method according to claim 7, further comprising the step of when a clutch, located between the motor and the transmission, is disengaged and the motor is idling, activating the hydraulic pump to increase the pressure in the associated accumulator if the pressure in the associated accumulator is less than the second lower-pressure threshold (P_2).

11. The method according to claim 1, further comprising the steps of recovering kinetic energy during the second driving situation; and
    utilizing the recovered kinetic energy to at least partially power the hydraulic pump for increasing the pressure in the associated accumulator.

* * * * *